Jan. 29, 1957  C. J. BORKOWSKI ET AL  2,779,875
GALVANOMETER PULSE ANALYZER SYSTEM
Filed April 6, 1954  3 Sheets-Sheet 2
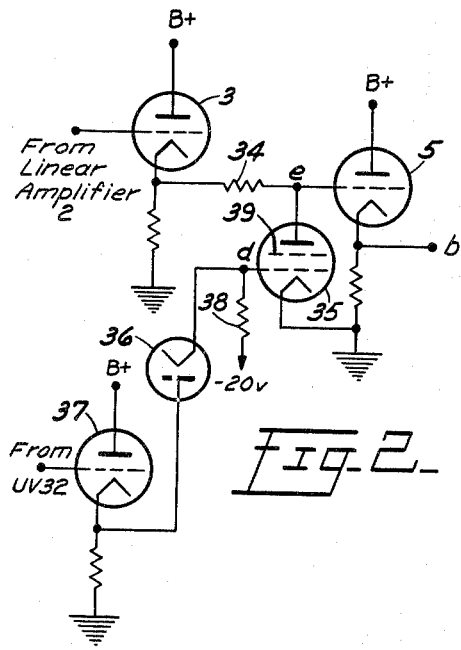
Fig-2-
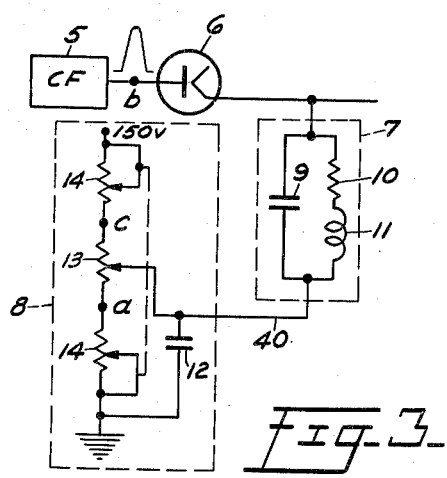
Fig-3-
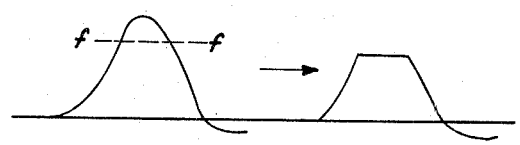
Fig-5-
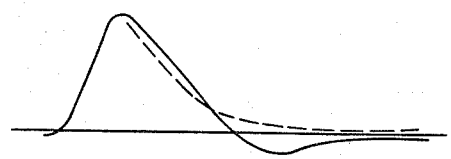
Fig-4-
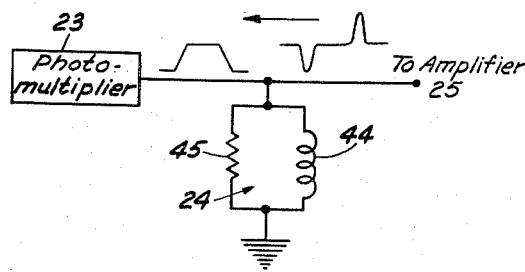
Fig-6-
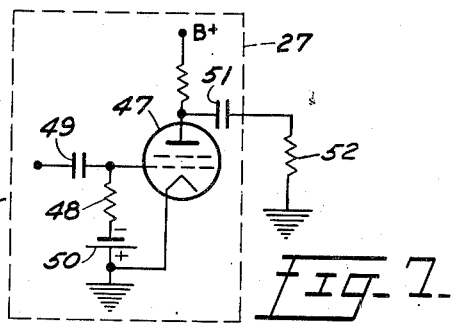
Fig-7-
INVENTORS
Casimer J. Borkowski
Frank M. Porter
BY
ATTORNEY Jan. 29, 1957 C. J. BORKOWSKI ET AL 2,779,875
GALVANOMETER PULSE ANALYZER SYSTEM
Filed April 6, 1954 3 Sheets-Sheet 3
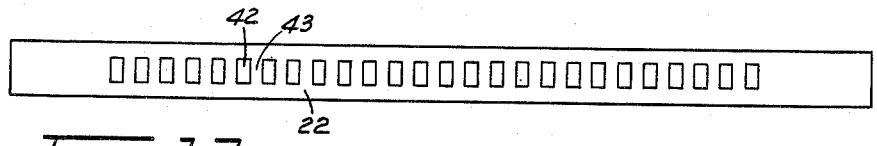
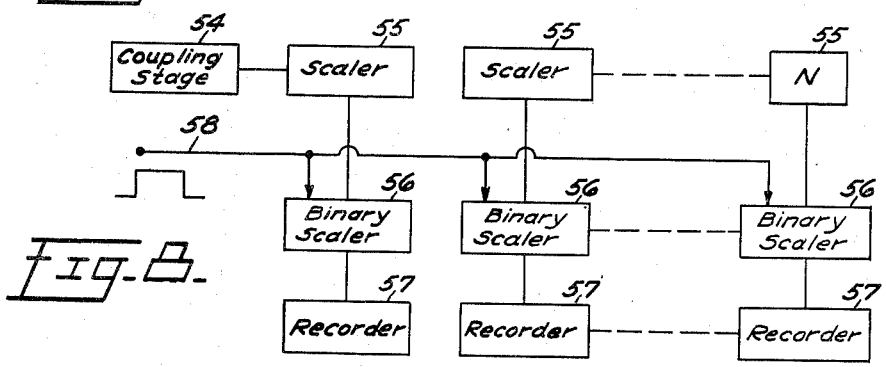
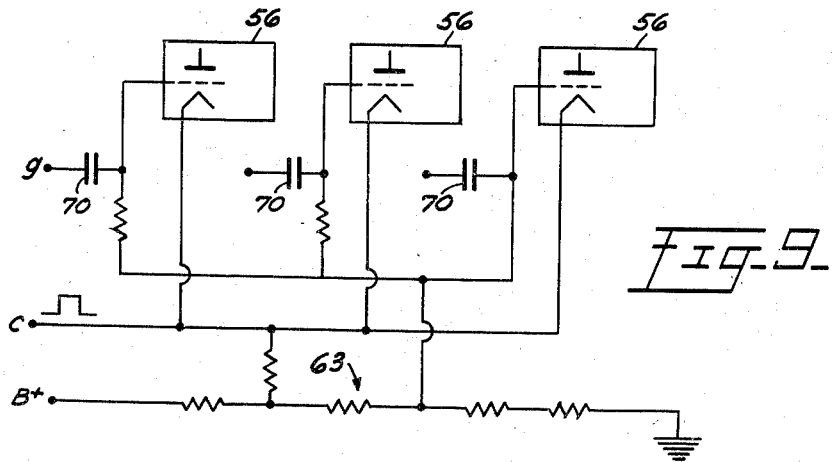
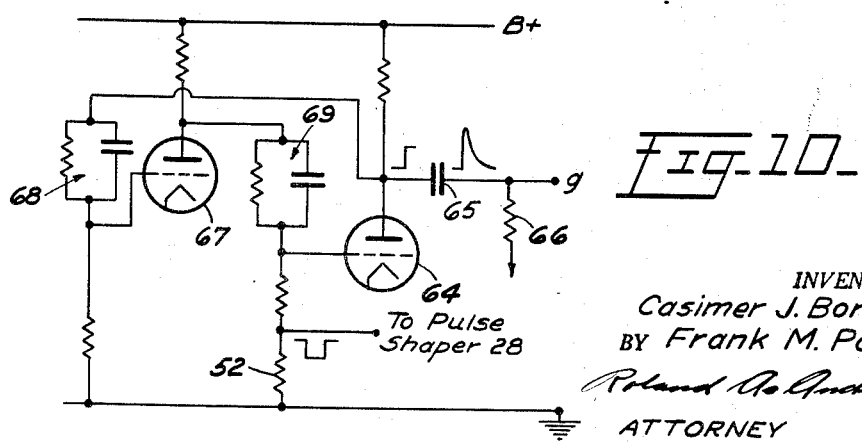
INVENTORS
Casimer J. Borkowski
BY Frank M. Porter
ATTORNEY

United States Patent Office 2,779,875
Patented Jan. 29, 1957

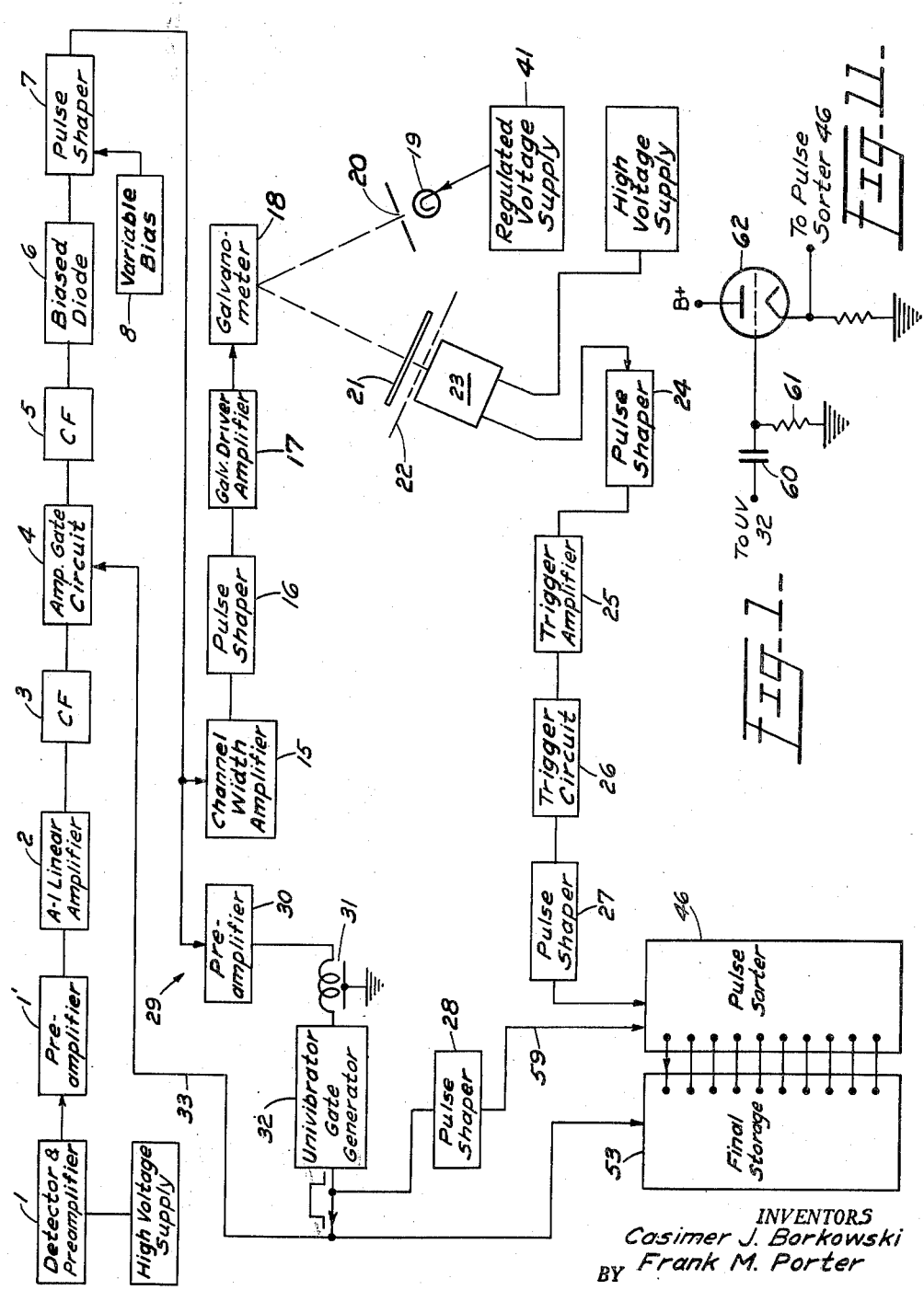

2,779,875

GALVANOMETER PULSE ANALYZER SYSTEM

Casimer J. Borkowski and Frank M. Porter, Oak Ridge, Tenn., assignors to the United States of America as represented by the United States Atomic Energy Commission Application April 6, 1954, Serial No. 421,465

12 Claims. (Cl. 250—83.3)

This invention relates to pulse analyzers of the multi-channel type and more particularly to a galvanometer type analyzer wherein the pulses analyzed are measured in terms of the area under them and a plurality of signals corresponding thereto are recorded, serving as an indication of pulse height, and is an improvement over our co-pending application S. N. 421,464, filed April 6, 1954.

The ideal system for determining the voltage pulse distributions from scintillation spectrometers, proportional counter spectrometers, or pulse ion chamber spectrometers would measure the amplitude of every pulse from the detector with the required precision and sort these pulses into as many channels as may be required. For such an ideal system to provide the desired performance, a multi-channel analyzer with fifty to one hundred channels would be required. However, such a system would necessarily be complex and involve a great many components if conventional circuitry were employed. This would introduce difficult problems resulting from changes in tube characteristics, drifts of bias of various channels off calibration, and changes in supply voltages which would alter the operating characteristics of the various channels. Thus, the number of channels which may be associated together using conventional triggers and anti-coincidence circuits to define each channel edge are limited because of difficulties encountered in keeping the channel widths constant and the equipment properly calibrated, aligned and cooled.

In our co-pending application, supra, we have met some of these problems by providing an electrostatic type analyzer using a single trigger circuit for multi-channel counting. In this arrangement, a series of impulses corresponding to the fall time of the pulse are used as a measure of the magnitude of the pulse being analyzed. By utilizing only the trailing edge of the wave to initiate the impulses, it is necessary to use a longer grid with a larger number of openings to obtain the described impulses, than would be necessary if it were possible to use both the leading and the trailing edges of the wave for this purpose.

Applicants with a knowledge of these problems of the prior art have for an object of their invention the provision of a multi-channel analyzer having a smaller number of components and, therefore, a greater accuracy and stability than the systems of the prior art.

Applicants have as another object of their invention the provision of a multi-channel analyzer which eliminates a number of trigger channels and associated components and thereby reduces the cost of construction and the power required for the operation of the system.

Applicants have as a further object of their invention the provision of a multi-channel analyzer wherein the magnitude of the pulses is measured by a galvanometer as a function of a series of light impulses sent out as a result of the deflection of a beam of light across a slotted grid structure, so that only a single trigger circuit is necessary to determine how far over the edge of the slot wall the beam must be before it is measured.

Applicants have as a further object of their invention the provision of a system employing a galvanometer for deflecting the beam over a grid structure so that the area under the pulses is integrated, and impulses may be generated both on the rise and the fall of the pulse, so that for a given spacing of openings in the grid structure, more channels are made available and increased range is attained in the analyzer.

Other objects and advantages of our invention will appear from the following specification and accompanying drawings, and the novel features thereof will be particularly pointed out in the annexed claims.

In the drawings, Fig. 1 is a schematic of our improved system for measuring pulses employing the galvanometer type of analyzer.

Fig. 2 is a schematic of a gate circuit employed in our improved analyzer system.

Fig. 3 is a schematic of the biased diode, pulse shaping network, and variable bias voltage source employed in our improved system.

Fig. 4 is a schematic of the wave appearing at the output of the circuit of Fig. 3.

Fig. 5 is a schematic of the wave entering and leaving the second pulse shaper and before it is fed to the galvanometer analyzer.

Fig. 6 is a schematic of a pulse shaper fed by the photo multiplier.

Fig. 7 is a schematic of another pulse shaper which feeds the ring type scaler.

Fig. 8 is a block diagram showing the relation of various stages of the ring type scaler to the Higginbotham binary scalers and their recorders.

Fig. 9 is a schematic showing the coupling between the various Higginbotham scalers.

Fig. 10 is a schematic of one stage of a ring type scaler and the manner of coupling it to a Higginbotham type binary scaler.

Fig. 11 is a schematic of the pulse shaper used in the control circuit for the binary scalers.

Fig. 12 is a plan view of one form of grid which is suitable for use in our system.

Referring now to the drawings in detail, 1 designates a pulse detector such as a proportional counter which may feed its pulses into a preamplifier 1' and then to a linear amplifier 2 of the A–1 type such as is described in an article in vol. 18 of the "Review of Scientific Instruments" by Jordan and Bell beginning at page 10. The A–1 amplifier 2 amplifies the pulse which is then fed through a cathode follower 3 to a gate 4, and from the gate 4 to a second cathode follower 5, and a biased diode 6 to a pulse shaper 7. The gate 4 acts to prevent the passage of pulses through the system when there is a pulse present and being analyzed in the system.

The action of the gate 4 is controlled by a control circuit 29 which is fed from the output of the pulse shaping network 7. This control circuit includes a preamplifier 30 for increasing the magnitude of the control signal. The output of the preamplifier 30 is then fed into a delay circuit 31 to delay the control signal until the trailing edge of the pulse to be analyzed has had an opportunity to pass through or clear the gate 4 before it is closed, and prevent the possibility of clipping off a portion of the wave. The signal from the delay circuit 31 is then fed into a univibrator 32 which produces a relatively long rectangular shaped pulse for application to the gate circuit 4 through lead 33. The length of this rectangular pulse is so chosen that when applied to the gate 4 it will close the gate 4 and maintain it in this condition for the duration of the time required to analyze the pulse which is in the system. This prevents subsequent pulses which may arrive at the gate 4 while a pulse is being analyzed from reaching the analyzer and causing false operation. The decay of this rectangular pulse then permits another pulse to pass through the analyzer where it may be examined.

The gate 4 in the input circuit of the system may take any suitable form but the one shown in Fig. 2 is preferred. In this figure the gate is shown with the cathode followers 3, 5 that precede and follow it. In this arrangement, the two cathode followers 3, 5 serve to couple the gate 4 into the system. The gate includes a resistor 34 which joins the two cathode followers, and a clamp in the form of a pentode 35 whose plate cathode circuit is bridged across the resistor 34 to ground. The input of the pentode 35 is coupled through a diode 36 and a cathode follower 37 to the output of the univibrator 32 in the control circuit 29. The positive rectangular pulse from the univibrator 32 is passed through lead 33, cathode follower 37 and diode 36 to the control grid of the clamp 35. Pentode 35 is normally biased to cut off by a negative potential applied to its grid through grid resistor 38, so that the rectangular positive pulse upon passing through diode 36 raises the potential of the point $d$, until pentode 35 conducts. Since the discharge path for this tube is through the resistor 34, the flow of the current through the tube creates a drop across the resistor and lowers the potential of the point $e$ to the extent that a large proportion of the current flow within the tube shifts from the plate to the screen grid 39. Now, if a pulse to be analyzed arrives at the input of the cathode follower 3 while the clamp is in this condition, the cathode follower conducts and this raises the potential of its cathode, and, in turn, tends to raise the potential of point $e$, causing the conduction within the tube 35 to shift back from the screen to the plate, clamping the control grid of the cathode follower 5, which is connected thereto, so that no signal can pass through tube 5.

The output of the cathode follower 5 is coupled through the biased diode 6 into the pulse shaper 7 whose operation is regulated by the variable bias 8. One form of pulse shaper 7 and variable bias 8 is schematically shown in Fig. 3, although any other appropriate arrangement may be employed. In passing through this pulse shaper, the top of the pulse is broadened out and the trailing edge is slanted to make it more suitable for feeding to the analyzer. The variable bias indicated in the dotted enclosure 8 comprises upper and lower resistor banks 14, 14 connected in series with a central resistor bank 13 to form a voltage divider. The voltage divider so formed is bridged between ground and an appropriate voltage supply of preferably 150 volts. The moving contacts of the upper and lower resistor banks 14, 14 are preferably ganged together so that they move as a single unit for adjustment purposes. The moving contact of the central resistor bank 13 is then connected to one side of the pulse shaper 7 through lead 40. Bridged across the lead 40 to ground is a large capacitor 12. The pulse shaper is enclosed in the dotted enclosure 7 and comprises a capacitor 9 shunted by a resistor 10 and inductance 11 connected in series. The end of the pulse shaper opposite that which was coupled to the variable bias 8 is connected to the cathode of the biased diode 6. This results in the pulse shaper 7 and variable bias 8 serving to bridge the input circuit for the analyzer and ground.

The purpose of the two resistor banks 14, 14 is to adjust the potential at point $a$ so that it is the same as point $b$. The purpose of resistor bank 13 is to adjust the potential of the cathode of diode 6 between the potentials of points $a$ and $c$ so as to determine the point on the pulse to be clipped off. The condenser 12 provides a low impedance path to ground around the resistor banks 13, 14 for pulses passing through the pulse shaper 7. The diode 6 passes a portion of each pulse which exceeds the level of its bias. These pulse portions first charge condenser 9, but since condenser 12, which is in the same circuit to ground as condenser 9, is very much larger than condenser 9, its voltage will change very little during this charging up operation of the condenser 9. This keeps the fall time of the pulse proportional to the amplitude so that the area under the wave is likewise proportional to the amplitude. This is important, because the galvanometer analyzer will integrate the pulse fed into it. Thus the pulse is measured in terms of the area under the wave as distinguished from its amplitude.

The discharge path of condenser 9 is through the resistor 10 and the inductance 11, while the discharge path of condenser 12 is through the resistor banks 13, 14. However, by making the capacity of condenser 12 as large as compared to condenser 9, the potential of the moving contact of the resistor bank 13 will not appreciably change during discharge of condenser 12. The condenser 12 provides a low impedance path for the charge and prevents the charge from building up too rapidly on the condenser 9. The removal of such condenser from the circuit would, therefore, only leave a high impedance path through the resistors 13, 14 to the condenser 9 and would not permit sufficient current flow to take place to build the necessary charge on the condenser. However, if the potential of the moving contact of the resistor 13 were permitted to rise and fall with the charging and discharging of the condensers, the slant of the trailing edge of the pulse to be analyzed would be modified and the linear relation between the height and area of the wave would be altered so that pulse amplitude could not be accurately measured in terms of area by the galvanometer analyzer.

Now in the pulse shaper 7 the rise of the wave would be the same as the incoming signal while the trailing edge of the wave would have the shape of a voltage curve formed by the discharge of a condenser through a series connected inductance and resistor. As indicated in Fig. 4, the full line indicates the shape of the resulting wave. By employing the inductance 11, the top of the wave is broadened out and the trailing edge is given a uniform slant. The dotted line indicates the type of wave which would be available if the inductance were not present. The top would be sharper and the trailing edge would fall exponentially.

The signal from the pulse shaper 7 feeds the control circuit 29 and is passed to the channel width amplifier 15 which will amplify the wave and will have the effect of spreading the pulse spectrum over more or less channels depending upon the amount of amplification. This amplifier also provides a suitable coupling to the pulse shaper 16, which may be of any desired type such as that described by W. E. Glenn, Jr., in Nucleonics, vol. 4, page 50 (June 1949). In the pulse shaper 16 the top of the pulse is clipped off as is indicated by the dotted line $f$—$f$ in the left portion of Fig. 5, and only the lower portions are passed to provide a wave shape of the general character indicated at the right in Fig. 5.

The pulse shaper 16 feeds the galvanometer driver amplifier 17. This amplifier may be of conventional form which is capable of producing very large current pulses to drive the galvanometer 18. The gavanometer 18 may be of any suitable type, but is preferably a Hathaway oscillating or rotating mirror galvanometer, No. OCZ. Light from any suitable lamp or source 19 operated from a regulated voltage supply 41, passes through rectangular slit 20 in a conventional shield or baffle plate to form a rectangular beam and upon reaching the mirror of the galvanometer is reflected onto a cylindrical lens 21 which serves to focus the rectangular beam to form a spot that travels over the grid structure 22 as the mirror is rotated in response to the current pulse from driver amplifier 17. Since the pulse rise time is short in respect to the response time of the galvanometer, it will reach its peak faster than the galvanometer can follow. This will limit the integrating action of the galvanometer to only a portion of the wave. However, since the total area or any portion thereof are proportional to amplitude, the integration of this fractional part of the area will serve as a measure of the amplitude of the pulse.

Now, the galvanometer 18 in its operation will cause the reflected light beam to travel over the grid 22 and produce a series of light impulses or signals which fall or impinge upon the light sensitive surface of a photo multiplier 23. The grid employed in this system may be of the same type used in our copending application, supra. One form of such grid is shown in Fig. 12. In this modification, the grid is preferably of thin sheet metal such as copper, and has at least twenty-five rectangular slots or blank spaces 42 and a corresponding number of webs 43 of the same width as the spaces or slots. The photo multiplier 23 may be of any suitable type but is preferably a Radio Corporation of America type 5819.

In the photo multiplier 23 the light signals or impulses are converted into corresponding current pulses which are fed into a pulse shaper 24 which produces voltage pulses whose amplitudes are proportional to the differential of the magnitude of the current pulses. One suitable form of pulse shaping circuit is shown in Fig. 6 wherein an inductance 44 is bridged across the output of the photo multiplier 23 to ground. It is shorted by a resistor 45 having a critical damping resistance corresponding to the size of inductance chosen for the circuit. The inductance 44 differentiates the current pulses fed thereto to form a pair of voltage pulses, while the shunting resistor 45 is of such value as will damp out the oscillations occurring in this circuit as a result of the action of the inductance. With time indicated as extending from right to left, the leading edge of the current pulse when differentiated, forms a positive voltage pulse, and the trailing edge of the current pulse, when differentiated forms a negative voltage pulse. The differentiated signals from the pulse shaper 24 are fed to a conventional trigger amplifier 25 to raise their magnitudes to such a level as will be more appropriate for operating the trigger circuit 26. The trigger circuit may be of any suitable type but preferably takes the form of a Schmitt trigger circuit such as is disclosed in "Electronics" by Elmore and Sands, published by McGraw-Hill Book Co., of New York, New York, in 1949, page 99. This trigger acts very much like a univibrator by responding to signals of a predetermined magnitude for producing rectangular waves, but differs from the univibrator by producing a pulse whose width is proportional to the width of the trigger signal or impulse.

The positive rectangular pulse from the trigger circuit 26 will be fed to the pulse shaper 27 which produces large negative pulses at its output to operate the ring scaler 46. While any suitable pulse shaper may be employed to drive the ring scaler 46, a preferred type is shown in Fig. 7. It comprises a pentode 47 having its control grid coupled to the trigger circuit 26 through a resistor 48 and capacitor 49 coupling of conventional type. A source of negative potential 50 normally maintains the pentode cut off. The output of the pentode is then coupled to the resistor 52 in the cathode circuit of the ring scaler through a coupling condenser 51. By biasing the pentode 47 below cut off and using a small resistor 52 in its output circuit, it will be seen that the pulses from the trigger circuit 26 will be inverted and large current pulses produced in the resistor 52.

While the pulse sorter 46 may be of any suitable type, such as that disclosed in our co-pending application, supra, the preferred type of sorter is a ring type scaler like the one described by T. K. Sharpless in an article in the March 1948 issue of "Electronics," entitled "High Speed N Scale Counters." However, if the ring scaler is selected, it will not likely be used with a matrix such as employed in the system of our co-pending application, supra. Instead, the final storage circuit 53 preferably comprises a series of Higginbotham binary type scalers which feed into recorders. In this arrangement, a Higginbotham binary scaler is provided for and fed by each stage of the ring scaler, and Fig. 8 shows a block diagram of a series of ring scaler stages with their corresponding Higginbotham binary scalers and associated recorders.

In the block diagram of Fig. 8, the coupling stage 54 precedes a series of scaler stages 55. For convenience, these have been indicated as including up to N stages. Each of the stages 55 of the ring scaler is coupled to a binary scaler 56, preferably of the conventional Higginbotham type such as is described in vol. 18 of the "Review of Scientific Instruments," page 706. Each binary scaler 56 drives a recorder 57 of conventional type for recording the counts thereof. Rectangular positive pulses from univibrator 32 are fed into the binary scalers 56 and while these pulses are present, the binary scalers 56 are rendered inoperative. Pulses arriving at the stages 55 of the ring type scaler from the pulse shaper 27 will be counted and upon completion of the count, the ring type scaler stage corresponding to the count will be left in the abnormal state. When the rectangular pulse from the univibrator 32 decays, the binary scalers 56 are then free to operate, a pulse shaper 28 fed by the univibrator 32 serves to differentiate the positive rectangular pulses from the univibrator 32 into a sharp leading positive pip and a sharp trailing negative pip. While this pulse shaper may take any suitable form, the one shown in Fig. 11 is a preferred type. It simply includes a capacitor 60 and resistor 61 to form a differentiating network which feeds the input of a cathode follower 62. The decay of the rectangular pulse of univibrator 32 results in the negative pip from the pulse shaper 28, referred to above, which is fed through the line 59 to the ring scaler and serves to flip the stage thereof which was left in the abnormal condition as the result of the count, so that this stage will return to the normal condition. The flip of the stage back to normal condition produces a positive pulse which triggers binary scaler 56 coupled to that stage. The binary scaler count is recorded on the corresponding recorder 57.

The action of the binary scalers may be better understood from the circuit of Fig. 9, wherein 63 designates a series of resistors coupled to form a voltage divider network which serves to raise the potential of the cathodes and adjust the bias of control grids of the coupling stages of each of the binary scalers 56. It will be seen that the positive rectangular pulses from the univibrator 32 are fed to the cathodes of these coupling tubes, and this has the effect of raising their potential to the point of tube cut off. As indicated at $g$, a positive pulse is fed to the control grid of the coupling tube of the first binary scaler 56, after the rectangular positive pulse applied to point $c$ has decayed. When the bias is removed from the cathode, the positive pulse from any ring scaler stage may trigger its corresponding binary scaler to count or store the pulse. This is accomplished by connecting the coupling stage of each binary scaler 56 through a coupling condenser 70 to a ring scaler stage. In this way, the count of the ring scaler, as evidenced by the abnormal condition of a stage thereof at the end of the count, will be taken by the binary scaler connected to that stage.

A reference to Fig. 10 will indicate how the positive pulse fed to the binary scaler 56 is derived. In this figure, the circuit of a single stage of the conventional ring scaler is shown. The stage of Fig. 10 comprises two tubes 67, 64 connected so that when one is fully operative the other is cut off. This provides the familiar flip-flop arrangement, so that each time a signal is sent through the stage it is caused to flip. The stable state in each instance is when one or the other of the pair of tubes is fully operative. This is accomplished by the grid to plate coupling arrangement employing the condenser resistor banks 68, 69. The reset negative signal from the pulse shaper 28 is fed into the grid circuit of the second tube of the stage across the resistor 52. This causes the second tube to cease conducting and the resulting positive pulse at the plate is differentiated in the network of condenser 65 and resistor 66. The positive pulse which appears at point g is sharpened and ready to be fed to the grid of the binary scaler 56 coupled thereto.

In the operation of the system, a pulse from the detector 1 is amplified in A–1 amplifier 2 and sent through the gate 4. Upon reaching the biased diode 6, the pulse is clipped and is broadened in the pulse shaper 7. The modified pulse is then fed to the channel width amplifier 15 and also to a control channel 29 including the preamplifier 30, and delay network 31. In the delay network, the control signal is delayed until the whole of the pulse to be analyzed has had an opportunity to pass through the gate 4 before it is closed as a result of the action of the control channel 29. The delayed signal from delay network 31 triggers the univibrator 32 to produce a positive rectangular pulse of such a width that when applied to gate 4 through channel 33, it will close the gate for a period sufficiently long to permit the system to analyze the pulse therein before admitting a second one for analysis.

The pulse width amplifier 15 increases the pulse height and the pulse shaper 16 clips off the top. The pulse is then fed to the galvanometer driver amplifier 17 which provides a current gain and suitable impedance match to the deflection galvanometer 18. The galvanometer 18 is deflected as a result of the pulses fed thereto and in accordance with the areas under the waves of such pulses. It causes the light beam from source 19, after being focused by lens 21, to travel across the grid 22 which produces light signals corresponding in number to the slots traversed by the beam during the deflection. These light signals are multiplied in the photo multiplier 23 which produces current signals at its output. These signals are fed to a pulse shaper 24 and are differentiated and converted into voltage signals therein, and after being amplified in amplifier 25 are fed to the trigger circuit 26. These impulses trigger the trigger circuit to produce positive rectangular pulses corresponding in number to the trigger impulses fed thereto. These positive rectangular pulses are then inverted and sharpened in the pulse shaper 27 and, as indicated in Fig. 1, are fed in the usual manner to the input of the ring scaler through the coupling stage 54, causing it to count the impulses. During this interval, the rectangular pulse from the univibrator 32 is applied through channel 58 to the cathodes of the binary scalers 56 and prevents them from operating while the stages of the ring scaler are changed from one stage to the other as the series of impulses from the galvanometer are counted therein. Then, as the last of the impulses is counted in the ring scaler, the rectangular pulse from the univibrator 32 decays removing the potential from the cathodes of the various binary scalers 56 so that they are rendered operative. In addition, the deflection of the rectangular pulse from the univibrator 32 produces the negative trailing pip at the output of the pulse shaper 28. This is a reset pip and is fed to the ring scaler, causing the stage of the ring scaler which is in abnormal condition to flip back to its normal condition. The flipping of this stage causes its corresponding binary scaler to be actuated to receive the count. Thus, it will be understood that each time the impulses resulting from a pulse being analyzed are counted on the ring scaler, they are then transferred to and actuate their corresponding binary scaler, and the counts of the various binary scalers are recorded on their associated recorders 57. The readings of these individual binary scalers and their associated recorders serve as a measure of the different categories of pulses which have been analyzed.

Having thus described our invention, we claim:

1. A pulse height distribution analyzer comprising a radiation detector for converting radiations into voltage pulses, a galvanometer analyzer for producing a series of electrical impulses corresponding in number to the areas under the pulses, and means fed by the analyzer for counting and sorting the pulses.

2. A pulse height distribution analyzer comprising a radiation detector for converting radiations into voltage pulses, a galvanometer analyzer coupled to the detector for producing a series of electrical impulses corresponding in number to the magnitudes of the pulses measured as a function of the areas under the pulses, means interposed between the detector and the analyzer for limiting the passage of pulses when there is a pulse being analyzed, and a counting and sorting means fed by the analyzer for receiving the impulses therefrom.

3. A pulse height distribution analyzer comprising a radiation detector for converting radiations into pulses, a galvanometer analyzer coupled to the detector for producing a series of electrical impulses corresponding in number to the magnitudes of the pulses as measured by the areas thereunder, a pulse shaper positioned in the input to the analyzer, and means fed by the analyzer for counting and sorting the impulses therefrom.

4. A pulse height distribution analyzer comprising a radiation detector for converting radiations into voltage pulses, a galvanometer analyzer fed by the detector for producing a series of electrical impulses corresponding in number to the magnitudes of the pulses as measured by the areas thereunder, a pulse shaper in the input to said analyzer, a gate interposed between the radiation detector and the pulse shaper for limiting the passage of pulses when a pulse is being analyzed in the system, and means coupled to the analyzer for counting and sorting the impulses therefrom.

5. A pulse height distribution analyzer comprising a radiation detector for converting radiations into voltage pulses, a galvanometer analyzer coupled to the radiation detector for producing electrical impulses corresponding in number to the magnitudes of the pulses as measured by the areas thereunder, a pulse sorter and counter fed by the analyzer for receiving all of the impulses from the analyzer, and storage means for receiving and storing the count of the impulses from the sorter and counter.

6. A pulse height distribution analyzer comprising a radiation detector for converting radiations into voltage pulses, a galvanometer analyzer coupled to the radiation detector for producing electrical impulses corresponding in number to the magnitudes of the pulses as measured by the areas thereunder, a pulse shaper interposed between the detector and the analyzer for shaping the pulses, a pulse sorter and counter fed by the analyzer for sorting and counting all of the impulses therefrom, and storage means for receiving and storing the count of the impulses from the sorter and counter.

7. A pulse height distribution analyzer comprising a radiation detector for converting radiations into voltage pulses, a galvanometer analyzer coupled to the radiation detector for producing electrical impulses corresponding in number to the magnitudes of the pulses as measured by the areas thereunder, a gate interposed between the detector and the analyzer for limiting the passage of pulses during the time when a pulse is being analyzed in the system, a pulse sorter and counter fed by the analyzer for sorting and counting all of the impulses therefrom, and storage means for receiving and storing the count of the impulses from the sorter and counter.

8. A pulse height distribution analyzer comprising a radiation detector for converting radiations into voltage pulses, a pulse shaper fed by the detector for shaping the pulses, a galvanometer analyzer for producing electrical impulses corresponding in number to the magnitudes of the pulses as measured by the areas thereunder, a gate interposed between the detector and the pulse shaper for limiting the passage of pulses during the period when a pulse is being analyzed in the system, a pulse sorter and counter fed by the analyzer for sorting and counting all of the impulses therefrom, and storage means for receiving and storing the count of the impulses from the sorter and counter.

9. A pulse height distribution analyzer comprising a radiation detector for converting radiations into voltage pulses, a galvanometer analyzer coupled to the detector for producing a series of electrical impulses corresponding in number to the magnitudes of the pulses as measured by the areas under them, a sorter and counter fed by the analyzer for sorting and counting all of the impulses, a storage circuit fed by the sorter and counter, and a control circuit coupled to the radiation detector for applying a delayed signal to the sorter and counter for transferring the count to the storage circuit.

10. A pulse height distribution analyzer comprising a radiation detector for converting radiations into voltage pulses, a galvanometer analyzer for producing a series of electrical impulses corresponding in number to the magnitudes of the pulses as measured by the areas under them, a pulse shaper interposed between the radiation detector and the analyzer for shaping the pulses, a sorter and counter fed by the analyzer for sorting and counting all of the impulses, a storage circuit fed by the sorter and counter, and a control circuit coupled to the detector for applying a delayed signal to the sorter and counter for transferring the count to the storage circuit after each pulse is analyzed.

11. A pulse height distribution analyzer comprising a radiation detector for converting radiations into voltage pulses, a galvanometer analyzer coupled to the detector for producing a series of electrical impulses corresponding in number to the magnitudes of the pulses as represented by the areas under them, a gate interposed between the detector and analyzer for limiting the passage of pulses during the time while a pulse is being analyzed, a sorter and counter fed by the analyzer for sorting and counting all of the pulses, a storage circuit fed by the sorter and counter, and a control circuit coupled to the detector for applying a delayed signal to the sorter and counter for transferring the count to the storage circuit after each pulse is analyzed.

12. A pulse height distribution analyzer comprising a radiation detector for converting radiations into voltage pulses, a pulse shaper coupled to the detector for shaping the pulses, a galvanometer analyzer for producing a series of electrical impulses corresponding in number to the magnitudes of the pulses as measured by the areas under them, a gate interposed between the detector and the pulse shaper for limiting the passage of pulses during the time when a pulse is being analyzed, a sorter and counter fed by the analyzer for sorting and counting all of the impulses therefrom, a storage circuit coupled to the sorter and counter for storing the impulses, and a control circuit fed by the detector for transferring the count to the storage circuit after each pulse is analyzed.

References Cited in the file of this patent

UNITED STATES PATENTS

| | | |
|---|---|---|
| 2,529,666 | Sands | Nov. 14, 1950 |
| 2,573,245 | Boyd et al. | Oct. 30, 1951 |
| 2,605,332 | Parsons | July 29, 1952 |
| 2,642,527 | Kelley | June 16, 1953 |

OTHER REFERENCES

Rev. of Scientific Inst., Feb. 1952, vol. 23, #2, pp. 67–72.

"Pulse-Amplitude Analysis in Nuclear Research," Rennes, Nucleonics, July 1952, pp. 20–27.